June 19, 1945. C. A. POSSON 2,378,863
MECHANICAL COMPUTING DEVICE
Filed Dec. 24, 1943 2 Sheets-Sheet 1
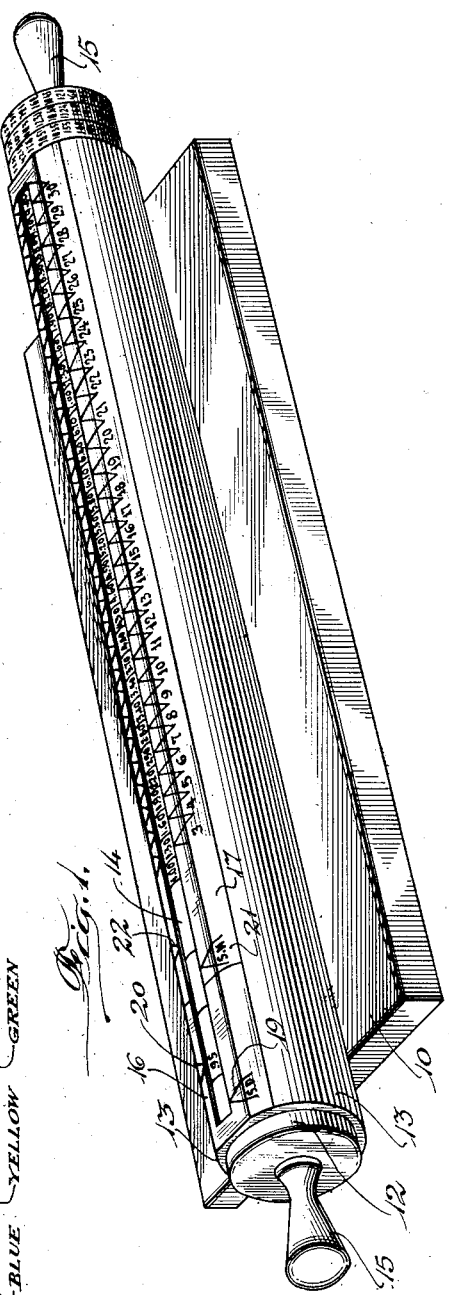

June 19, 1945.  C. A. POSSON  2,378,863
MECHANICAL COMPUTING DEVICE
Filed Dec. 24, 1943  2 Sheets-Sheet 2
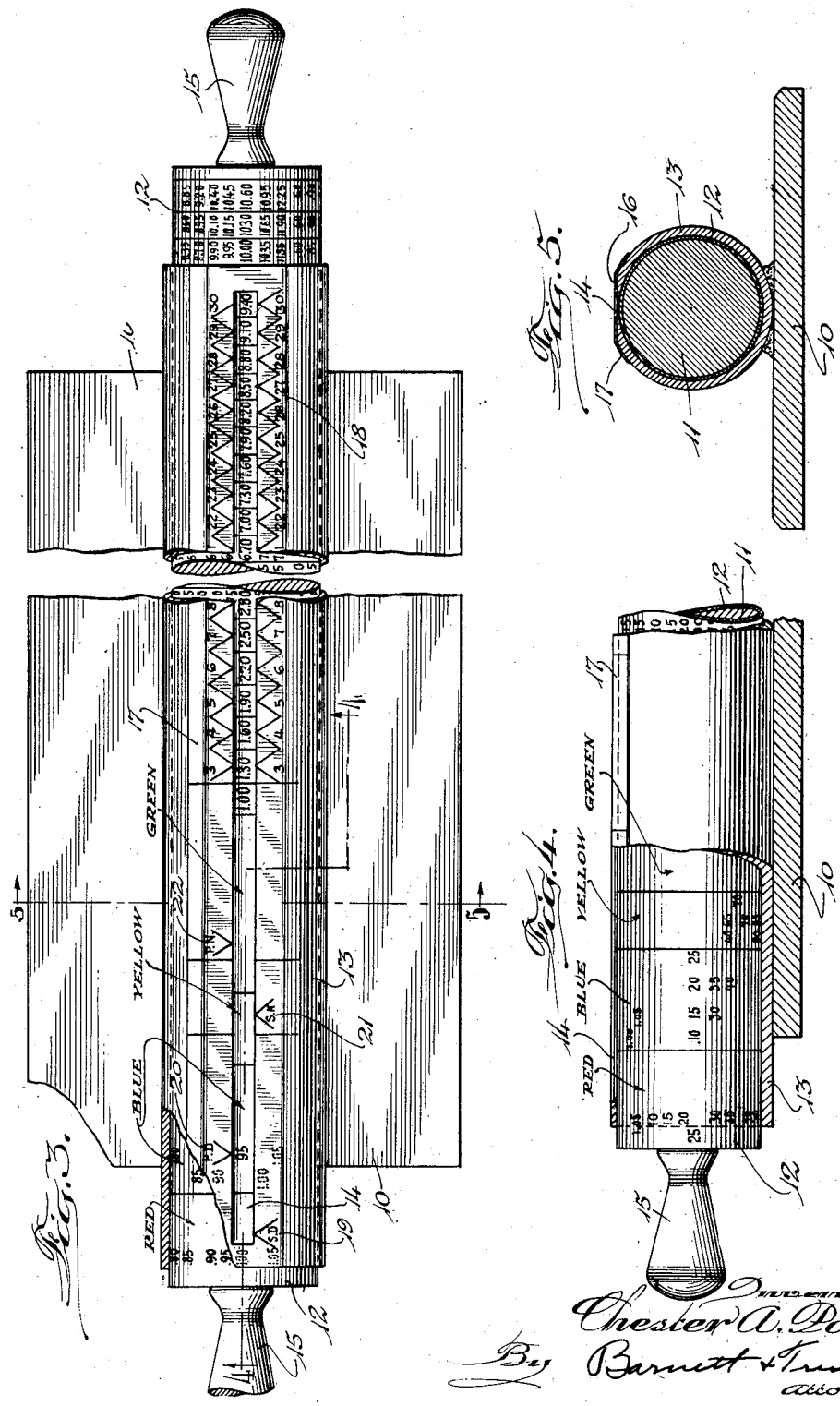

Patented June 19, 1945

2,378,863

UNITED STATES PATENT OFFICE 2,378,863

MECHANICAL COMPUTING DEVICE

Chester A. Posson, Chicago, Ill.

Application December 24, 1943, Serial No. 515,483

5 Claims. (Cl. 235—87)

This invention relates to certain new and useful improvements in mechanical computing devices.

A principal object of the invention is to provide a computing device of simple and inexpensive construction which will be particularly suitable for use in determining the charges of telephone toll calls and similar computations.

The charge for any specified long distance telephone call, as determined by the computation methods now in general use, will include a base rate determined in relation to the distance between the sending and receiving stations for a daytime station-to-station call of predetermined duration. The said base rate is then increased or reduced, as may be required, in relation to any change in the character of service, the time at which the service is rendered and the actual duration of the call.

According to the present invention, a manually operable core is slidably and revolubly supported in a tubular housing or in relation to an otherwise provided visible scale. The tube or scale, as the case may be, is legended to indicate a call of predetermined duration, for example 3 minutes, and a plurality of additional graduations of one minute each to designate the length of a call when it extends beyond the initial 3 minute period. The said scale is also provided with suitable pointers arranged in predetermined spaced relation and designating the character of service required, for example, station-to-station daytime call, person-to-person daytime call, station-to-station nighttime call and person-to-person nighttime call.

A removable data chart is suitably secured to the outer surface of the core. This chart is provided with separate columns or spaces of different widths each of which are provided with the several base rates positioned in different vertical and horizontal arrangement on the chart.

The said data chart is also provided with a series of columns containing the costs of calls based upon each of the previously mentioned base rates for any selected period of time on the scale. The said costs are so spaced relative to the positions of said base rates in the several base rate columns that when the core is moved to position any of the several base rates opposite the pointer for the column in which the selected base rate is located, it will position the cost of such call opposite the appropriate time period on the dial.

The invention, therefore, contemplates as a principal object the provision of a mechanical computing device constructed and operating in the manner above briefly described.

A further object is to provide a computing device of the above character in which a data sheet is removably attached to a movable member whereby the same operating mechanism may be readily used in connection with charts containing different data than herein illustrated.

Another and more specific object of the invention is to provide a simplified computing device including a scale member and a data supporting member in which one member is revoluble relative to the other and in which one member is movable lengthwise relative to the other.

Another specific object is to provide a computing device of the above general character with which computations can be made rapidly and accurately by operators without requiring any actual knowledge of mathematics.

The invention is illustrated in connection with computations relating to the toll charges of telephone calls. However, it will be apparent from this disclosure that it can be supplied with a different data chart and used for other computations.

In the drawings:

Fig. 1 is a view in perspective of one approved form of mechanical computing device constructed in accordance with this invention and showing the parts positioned to indicate a person-to-person daytime call having a base rate of 95¢.

Fig. 2 is a data chart adapted to be secured to a movable core member of the computing device.

Fig. 3 is a plan view of the computing device showing the parts arranged in a predetermined position to indicate the charges for a person-to-person nighttime call having a base rate of 95¢.

Fig. 4 is a fragmentary sectional view taken substantially on line 4—4 of Fig. 3 through the supporting member, the core being shown in elevation and in a position corresponding to that indicated in Fig. 3; and Fig. 5 is a cross-sectional view through the device on line 5—5 of Fig. 3.

Referring to the drawings, the improved device comprises three principal elements including a base member 10, a core 11 and a data chart 12. The base member 10 is provided with a tubular portion 13 for receiving the core member 11. The data chart 12 is removably secured to the core and is thereby movably supported relative to the tubular portion 13 of the base. The data chart may be secured to the core in any suitable manner, for example by adhesives or by clamping elements. The said core and chart are movable as a unit relative to the base. Preferably they are freely revoluble within the said tubular portion 13 whereby either, or a combination of said movements, may be utilized to arrange the data in a predetermined position relative to fixed graduations or indicators on the tubular member. In some instances the appropriate data may be moved by rotating the core to a position to properly arrange the figures in a window opening 14 formed in the tubular portion 13 of the base member. In other situations it will be necessary, as hereinafter explained, to rotate the core and to also slide it lengthwise of the base.

In order to facilitate either right or left hand operation, the opposite ends of the core are provided with handle knobs 15. The top portion of the tube 13 is preferably flattened, as indicated at 16, so as to provide a flat surface for a scale member. The scale member in the present embodiment comprises a removable sheet 17 having a central opening therein adapted to register with window opening 14 of the tubular portion 13 and adapted to be secured to the said tube, for example, by adhesives or other suitable means which will permit the scale to be removed when desired. However, in some situations, the scale will be made integrally with the tubular member. In either case, however, the scale includes a section 18 having minute graduations thereon numbered 3–30, inclusive, to indicate the probable duration of a toll call. In addition to the minute graduations there are also pointers, designated 19, 20, 21 and 22, which indicate the character of service rendered, for example, station-to-station or person-to-person calls. The pointer 19 is intended to indicate the base rate of station-to-station daytime calls. It is preferably given a distinctive color, for example, red, together with the legends "S-D," this being intended as an abbreviation of a station-to-station daylight call. The pointer 20 is given a distinctive color, for example, blue, and is given the legend "P-D" to indicate person-to-person daytime calls. The pointer 21 is colored yellow and is legended "S-N" to indicate a station-to-station nighttime call, and pointer 22 is colored green and is legended "P-N" to indicate a person-to-person nighttime call. Each of said pointers are so arranged, relative to the computations on the chart, that when the chart is positioned to indicate a toll call having a predetermined base rate, the total cost of the call will be positioned opposite the minute graduation on the scale corresponding to the length of the call.

The data chart 12 includes four columns A, B, C and D arranged at the left of the sheet and a plurality of cost columns E. The said columns A, B, C and D are preferably given distinctive colors, as red, blue, yellow and green and are intended to cooperate respectively with the red, blue, yellow and green pointers of the scale 17. In other words, the respective pointers, when used in a computation, are always positioned within the columns A, B, C or D of the corresponding color and are used only in connection with the figures appearing in that column. The figures in the several columns A, B, C and D are the current base rates for telephone toll calls between twenty different stations. They are based upon the mileage between the calling and receiving stations and increase at the rate of 5¢ per each predetermined unit of distance intervening between said stations.

The cost columns E show the cost of telephone calls for each of the said base rates. The first of said columns, designated E', correspond in general to the said base rates for station-to-station daytime calls and show the total cost of the first 3 minutes of a call. The other columns at the right of column E' contain computations showing the total cost of the call over any number of minutes shown on the scale 17.

In the column A the various base rates are all arranged, except the 25¢ and 40¢ rates, in vertical alignment. These represent station-to-station daytime calls of a predetermined duration, for example 3 or 5 minutes. It will be here observed that the several base rates in column A, except the 25¢ and 40¢ rates, can be positioned in the window 14 opposite the pointer 19 by merely rotating the core 11 relative to the base. It will be also observed that when each of the said base rates of said column are positioned opposite the pointer 19 of scale 17, a corresponding number indicating the cost of the first 3 minutes of the call appears in window 14 opposite the 3 minute graduation of scale 17. If the call extends beyond the period of 3 minutes, the numeral arranged opposite the minute graduation of the scale corresponding to the length of the call represents the total cost of the call. The same is true also when the 25¢ and 40¢ base rates of column A are positioned opposite the pointer 19. For example, when the core 11 of the device is rotated to bring the said base rate 40 into the window 14 and then moved lengthwise toward the left until the numeral 40 assumes a position opposite the pointer 19. With the parts in this position, the numeral 40 in the first column E at the right of column E' will be positioned in window 14 opposite the pointer 19 so as to indicate that the total cost of the first 3 minutes of the call is 40¢. The cost of a 3 minute call having a base rate of 25¢ is found in the same manner by positioning the 25¢ base rate of column A opposite the cooperating pointer 19.

The same base rates, as shown in column A, are arranged in column B but in a different order. The order of arrangement in colmn B is such that the core 11 requires both rotational and lengthwise sliding movements to position the various rates in window 14 and opposite pointer 20. However, regardless of whether the core is rotated or moved lengthwise, any time a different numeral within column B is placed opposite the pointer 20, a different cost will be indicated in the window 14 opposite the several minute graduations on the scale. These numerals represent the cost of the person-to-person daytime call. The lateral shifting of the core 11 toward the left, for example from numeral 10 to 25 in column B, positions the numeral 35 opposite the 3 minute graduation of the scale, thereby indicating that a 3 minute person-to-person call at the base rate of 25¢ will cost 35¢. The numerals positioned opposite the other graduations of the scale indicate that there is a further charge of 5¢ for each additional minute of the call.

For toll calls having base rates less than 40¢, there is ordinarily no difference between the station-to-station daytime calls and the station-to-station nighttime calls. The column C, therefore, includes only the base rates from 40¢ to $1.05. These rates, it will be observed are also spaced at different locations both vertically and laterally so that when any of the base rates included in said column are positioned opposite the pointer 21, the appropriate charges for any station-tostation nighttime call, up to and including a duration of thirty minutes, will be indicated in the window opening 14 opposite the graduation of the scale corresponding to the length of the call.

The base rate for person-to-person nighttime calls are ordinarily the same as person-to-person daytime calls for stations having base rates from 10¢ to 35¢. Column D of the data chart, therefore, contains only the base rates of 40¢ to $1.05, inclusive. These various base rates are so arranged that when any one of the rates included in the column are positioned opposite the pointer 22, the cost of the person-to-person nighttime call, up to and including thirty minutes, will be indicated in the window 14 of the device opposite the graduation of the scale corresponding to the length of the call.

As a further illustration of the manner in which the computing device operates, it will be seen by reference to Fig. 1 that the parts of the device are positioned to indicate a person-to-person daytime call having a base rate of 95¢, since the numeral 95 of column B is positioned opposite the pointer 19 of scale 17. By reference to the 3 minute graduation of the scale 17 it will be seen that the cost of the first 3 minute period of the call is $1.30. Inspection of the additional minute graduations of the scale indicates that an additional charge of 30¢ is made for each additional minute, up to and including $9.40 for a thirty minute call. It will also be observed by inspection of Fig. 2 that when the core of the device is turned so as to position the numeral 95 of column D opposite the pointer 22, the cost of a person-to-person nighttime call will be 95¢ for the first 3 minutes and 20¢ for each additional minute thereafter up to and including $6.35 for a thirty minute call.

While the invention has been shown and described herein in connection with computations relating to telephone calls, it is obvious that the apparatus including the arrangement of the data on the chart can be modified so as to be suitable for use in other computations. It will be understood, therefore, that the invention is intended to include all such modifications as come within the scope of the appended claims.

I claim:

1. A computing device comprising, in combination, a tubular member provided with a window opening therein and a series of spaced graduations along the edge thereof and having index pointers thereon in predetermined spaced relation, a data member revolubly and slidably supported relative to the scale and having separate parallel columns of like numerals for each of said index pointers with the numerals of one column arranged out of horizontal alignment with like numerals of an adjacent column and with certain of the numerals of a column arranged to extend in directions at right angles to each other, whereby certain of the numerals require rotational and lengthwise movement of the data member to position a selected numeral opposite a predetermined index pointer, and a series of computations having predetermined values relative to said selected numeral arranged in horizontal alignment therewith and in alignment with predetermined graduations of said scale.

2. A computing device comprising, in combination, a base member provided with a hollow cylinder formed with a window opening extending lengthwise thereof and having a scale adjacent the window, the said scale including a series of time graduations and a plurality of index pointers arranged in predetermined spaced relation to each other and to the said graduations, a data chart revolubly and slidably supported in said cylinder and provided with separate groups of like index numerals arranged in parallel columns for each of said index pointers with the numerals of one column arranged out of horizontal alignment with like numerals of an adjacent column and with a series of computations arranged in horizontal alignment with the various index numerals and having predetermined values relative to the index numbers with which they align and with the time graduations on the scale, whereby the positioning of an index number opposite its associated pointer will position a series of computations opposite their associated graduations of said scale.

3. A computing device comprising, in combination, a base member provided with a hollow cylinder formed with a window opening extending lengthwise thereof and having a scale adjacent the window, the said scale including a series of time graduations and a plurality of index pointers arranged in predetermined spaced relation to each other and to the said graduations, a core member revolubly and slidably supported in said cylinder, a data chart secured to the core and provided with separate groups of index numerals arranged in predetermined vertical and lateral order, in parallel columns for each of said index pointers with the numerals of one column arranged out of horizontal alignment with like numerals of an adjacent column and with a series of computations arranged in horizontal alignment with the various index numerals and having predetermined values relative to the index numbers with which they align and with the time graduations on the scale, whereby the positioning of an index number in said window opening opposite its associated pointer will position a series of computations in said window opening opposite their associated graduations of said scale.

4. A computing device for computing the cost of a service which may vary as to duration and character of the service rendered comprising, in combination, a base member provided with a series of time graduations and a series of index pointers arranged in predetermined spaced relation to each other and to said graduations, a data chart revolubly and slidably supported relative to said scale, the said chart including separate groups of base charges of like value arranged in predetermined vertical and lateral order in parallel columns with base charges of one column being arranged out of horizontal alignment with like base charges of an adjacent column, one column for each of said index pointers, and a series of computations in horizontal alignment with each of the said base charges and having predetermined values relative to the base charge with which they align and relative to the several graduations of the scale, whereby the positioning of a selected base charge opposite its associated pointer will position certain of the said computations opposite predetermined graduations of said scale to indicate the cost of said service for different time periods.

5. A device for mechanically determining the cost of telephone toll calls comprising, in combination, a tubular base member formed with a window and provided with a scale having pointers thereon along the edge of the window to indicate the character of service rendered and time graduations arranged along the edges of the window to indicate the duration of the call, a data supporting member revolubly and slidably supported in said base and having a plurality of base rates arranged thereon in parallel columns representing the character of service rendered and with a plurality of parallel columns containing computations including said base rates for costs of calls of various durations and for the various classes of service, which computations are arranged in horizontal alignment with the several base rates and in predetermined spaced relation to the said pointers and said minute graduations, whereby the positioning of any base rate of a selected column opposite its associated service pointer arranges the cost of such call for any specified time on the scale opposite the time graduation corresponding to the length of the call.

CHESTER A. POSSON.